United States Patent
Scalzo et al.

(10) Patent No.: US 9,550,235 B2
(45) Date of Patent: Jan. 24, 2017

(54) METHOD OF SUPPORTING A PART

(71) Applicant: Pratt & Whitney Canada Corp., Longueuil (CA)

(72) Inventors: Orlando Scalzo, Montreal (CA); Marc Campomanes, Longueuil (CA)

(73) Assignee: PRATT & WHITNEY CANADA CORP, Longueuil, Quebec ( * ) Notice: Subject to any disclaimer, the term of this patent is extended or adjusted under 35 U.S.C. 154(b) by 549 days.

(21) Appl. No.: 13/960,937

(22) Filed: Aug. 7, 2013

(65) Prior Publication Data

US 2015/0040377 A1 Feb. 12, 2015

(51) Int. Cl.
| | |
|---|---|
| *B22F 3/24* | (2006.01) |
| *B22F 3/22* | (2006.01) |
| *B32B 18/00* | (2006.01) |
| *C04B 35/56* | (2006.01) |
| *C04B 35/634* | (2006.01) |
| *C04B 35/638* | (2006.01) |
| *C04B 35/64* | (2006.01) |

(52) U.S. Cl.
CPC ............ *B22F 3/24* (2013.01); *B22F 3/225* (2013.01); *B32B 18/00* (2013.01); *C04B 35/56* (2013.01); *C04B 35/634* (2013.01); *C04B 35/638* (2013.01); *C04B 35/64* (2013.01); *B22F 2003/248* (2013.01); *C04B 2235/5436* (2013.01); *C04B 2235/5445* (2013.01); *C04B 2235/6022* (2013.01); *C04B 2235/9623* (2013.01); *C04B 2237/36* (2013.01); *Y10T 29/49998* (2015.01)

(58) Field of Classification Search
CPC ........... B22F 3/005; B22F 3/087; B22F 3/093; B22F 2201/01; B22F 2201/15; B23Q 3/086; B23Q 3/062; B23Q 3/065; Y10T 29/49988; Y10T 29/49993; Y10T 29/49998; Y10T 29/5184; Y10T 29/53535
See application file for complete search history.

(56) References Cited

U.S. PATENT DOCUMENTS

| | | | | |
|---|---|---|---|---|
| 3,197,328 | A | * | 7/1965 | Jung .................... B01J 8/16 118/423 |
| 3,660,949 | A | * | 5/1972 | Coes, Jr. ................ B23Q 3/08 164/76.1 |
| 3,953,013 | A | * | 4/1976 | Griffith ................ B23Q 3/086 269/21 |
| 4,197,899 | A | * | 4/1980 | Ernest .................... B22C 9/04 164/235 |
| 4,329,175 | A | | 5/1982 | Turner |
| 4,431,449 | A | | 2/1984 | Dillon et al. |

(Continued)

FOREIGN PATENT DOCUMENTS

JP     H02 153004     6/1990

*Primary Examiner* — Christopher M Koehler
(74) *Attorney, Agent, or Firm* — Norton Rose Fulbright Canada

(57) ABSTRACT

A method of supporting a part with particulate shape retaining media, the method including placing the part on a bed of the particulate shape retaining media, fluidizing the particulate shape retaining media until the part penetrates therein, and vibrating the bed of particulate shape retaining media to compact the particulate shape retaining media around the part. The part may be a green part to be debound in a powder injection molding process. Fluidization may be performed through vibrations at a different frequency than the compaction.

18 Claims, 3 Drawing Sheets

(56) References Cited

U.S. PATENT DOCUMENTS

| | | | |
|---|---|---|---|
| 4,454,906 A * | 6/1984 | Musschoot | B22C 15/10 |
| | | | 164/34 |
| 4,501,718 A | 2/1985 | Bradt | |
| 4,859,070 A * | 8/1989 | Musschoot | B06B 1/10 |
| | | | 164/203 |
| 5,028,367 A | 7/1991 | Wei et al. | |
| 5,950,063 A | 9/1999 | Hens et al. | |
| 6,267,364 B1 * | 7/2001 | Zhang | B25B 1/18 |
| | | | 269/7 |
| 8,568,117 B2 | 10/2013 | Scancarello | |
| 2010/0236688 A1 | 9/2010 | Scalzo et al. | |
| 2010/0262149 A1 | 10/2010 | Charles et al. | |
| 2014/0203468 A1 * | 7/2014 | Humphries | C04B 26/14 |
| | | | 264/71 |

\* cited by examiner

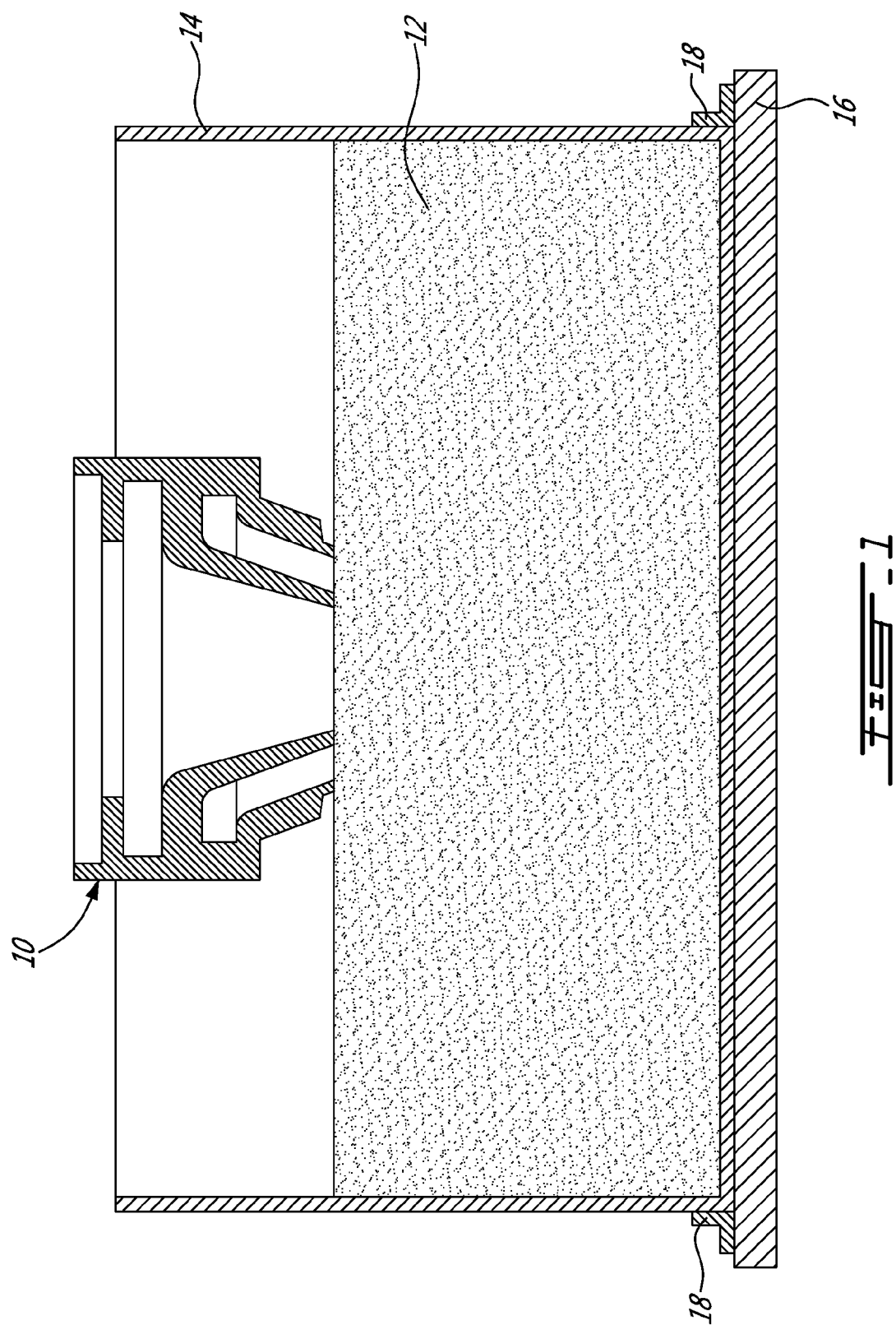

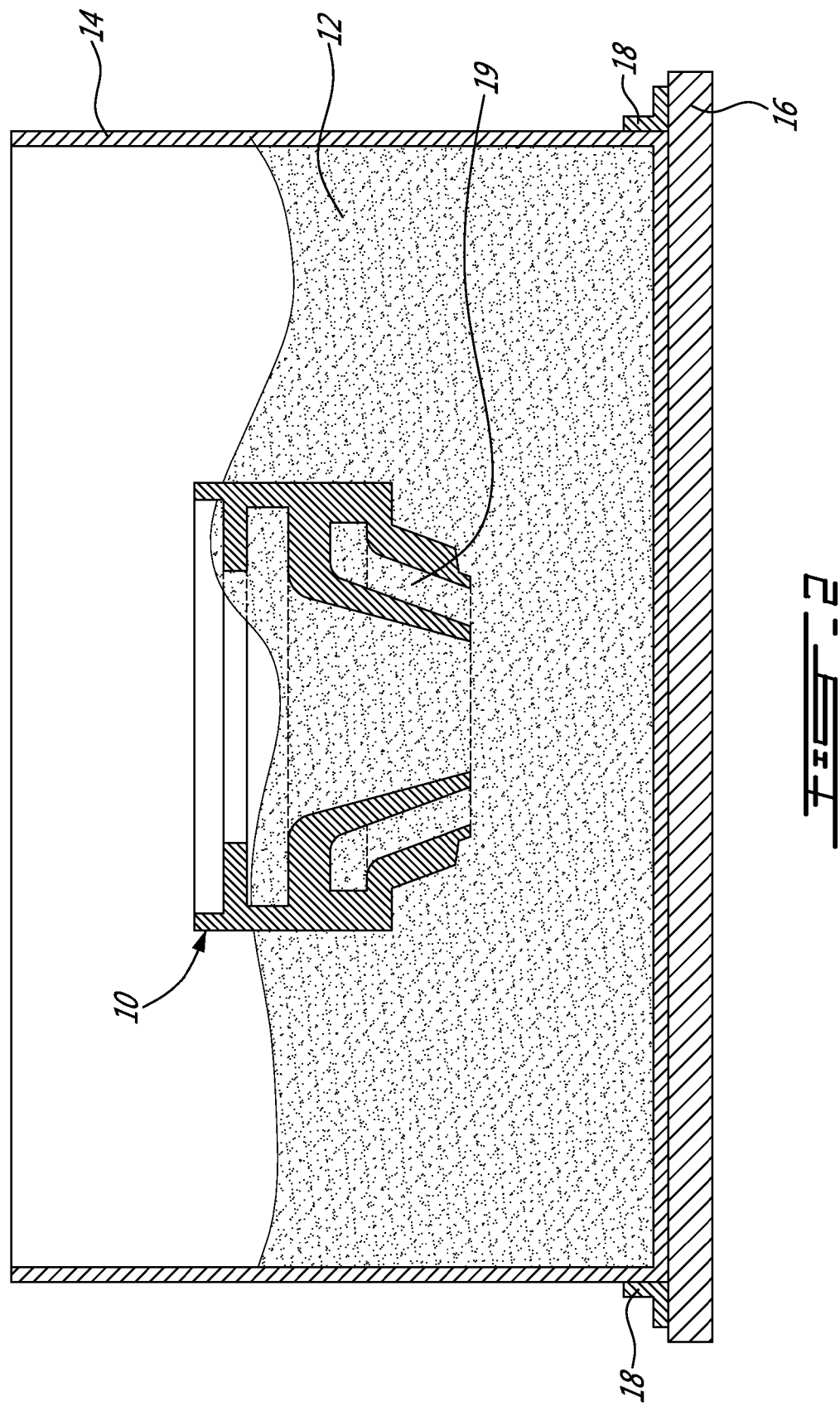

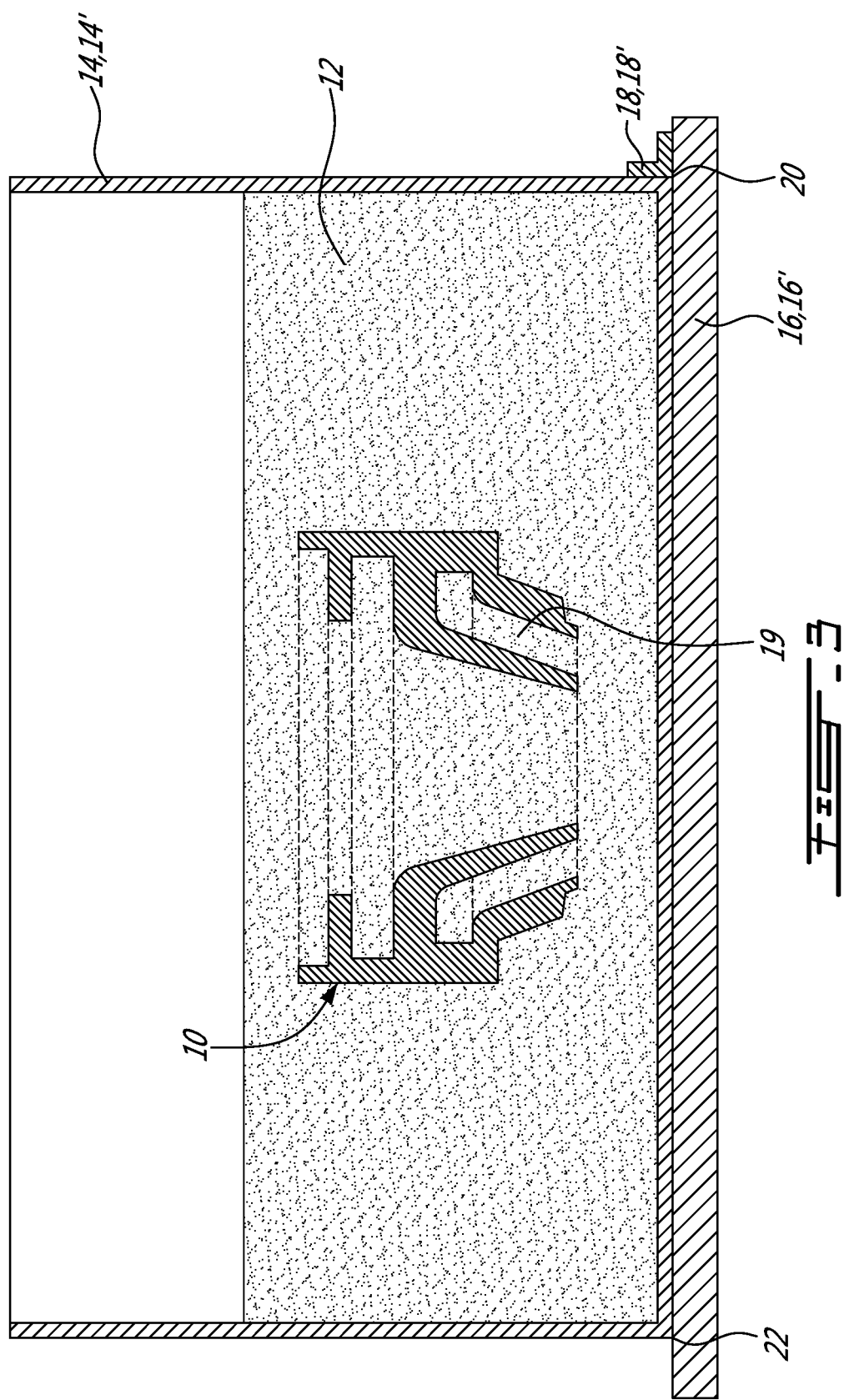

METHOD OF SUPPORTING A PART

TECHNICAL FIELD

The application relates generally to supporting of parts using particulate material and, more particularly, to the supporting of green parts in a powder injection molding process.

BACKGROUND OF THE ART

Powder injection molding (PIM) can be used to produce complex shaped parts of metal, ceramic and/or carbide materials. PIM involves injection of a feedstock including a binder and a powder material such as a metal, a ceramic, or carbide into a mold to produce a green part. This green part is further processed in a debinding step to eliminate the binder, and a porous and friable brown part is produced. The brown part is sintered to obtain the final product that may be in the form of a complex shaped part. Metal injection molding (MIM) is a type of PIM which may be used to manufacture metal parts.

The green part is usually placed in a supporting material, for example in a particulate material, before the debinding process such as to minimize shape deformations during the removal of the binder. However, it may be difficult for green parts having complex shapes to provide for adequate engagement of the particulate material with the part.

SUMMARY

In one aspect, there is provided a method of supporting a part with particulate shape retaining media, the method comprising: placing the part on a bed of the particulate shape retaining media; fluidizing the particulate shape retaining media until the part penetrates therein; and vibrating the bed of particulate shape retaining media to compact the particulate shape retaining media around the part.

In another aspect, there is provided a method of supporting a part with particulate shape retaining media, the method comprising: placing the part on a bed of the particulate shape retaining media; vibrating the bed at a first frequency causing fluidization of the particulate shape retaining media; and after the part is covered by the shape retaining media, compacting the shape retaining media with vibrations at a second frequency different from the first frequency.

DESCRIPTION OF THE DRAWINGS

Reference is now made to the accompanying figures in which:

FIG. 1 is a schematic cross-sectional view of a green part placed on a bed of particulate shape retaining media, in accordance with a particular embodiment;

FIG. 2 is a schematic cross-sectional view of the green part and bed during fluidization of the particular shape retaining media, in accordance with a particular embodiment; and FIG. 3 is a schematic cross-sectional view of the green part and bed during subsequent compaction of the particular shape retaining media, in accordance with a particular embodiment.

DETAILED DESCRIPTION

There is described herein a method of supporting a green part created after the injection step of a power injection molding process, which in a particular embodiment is a metal injection molding process (MIM). In a particular embodiment, the green part is integrally molded. In another embodiment, the green part includes two or more green parts assembled while still in the green state, as described in application Ser. No. 12/408,078 filed Mar. 20, 2009, which is incorporated by reference herein.

A green part as discussed herein refers to a molded part produced by a solidified binder that holds the injection powder together; the green part may be at least one of dense, tightly packed, substantially non-porous, and such that any voids between the injection powders particles are filled with solidified binder.

Thus, in a particular embodiment, each green part is created by injection molding of a feedstock, which is a homogeneous mixture of an injection powder (metal, ceramic, glass, carbide) with a binder. In a particular embodiment, the metal, ceramic and/or carbide powder is mixed with the molten binder and the suspension of injection powder and binder is injected into a mold and cooled to a temperature below that of the melting point of the binder. Alternately, the feedstock is in particulate form and is injected into a heated mold where the binder melts, and the mold is then cooled until the binder solidifies.

In a particular embodiment, the injection powder is a metal, ceramic or carbide injection powder with a mean particle size generally varying in a range from about 100 µm to about 0.1 µm, and preferably 50 µm to about 0.1 µm.

In a particular embodiment, the percentage injection powder to total feedstock is in a range from 30 to 80% powder solids by volume of the total feedstock mixture, and preferably above 50% powder solids by volume of total feedstock mixture.

In a particular embodiment, the binder is an organic material which is molten above room temperature (20° C.) but solid or substantially solid at room temperature. The binder may include various components such as lubricants and/or surfactants, and may include a mixture of a lower and a higher melting temperature polymer or polymers. Examples of binders include polypropylene (PP), polyethylene (PE), polystyrene (PS), polyvinyl Chloride (PVC), paraffin Wax 60 (PW), polyethylene glycol 65 (PEG), microcrystalline wax 70 (MW), and combinations thereof.

In an embodiment where the green part is composed of two or more green parts molded separately, allowed to cool and then assembled while in the green state, the green parts may be manufactured using different injections powders for individual green parts. Alternately, all green parts may be manufactured using the same injection powder. The green parts may be connected using permanent or non-permanent type connections, which may be substantially hermetic (substantially airtight or sealed) or not, and which may be formed by threaded engagement, through mechanical connectors made of feedstock or filler feedstock including but not limited to bolts, clips, clamps, couplings, lugs, pins and rivets, through the addition of a small amount of molten feedstock to the junction between the parts, through heating one or more of the parts near the junction to locally melt the binder, through heating one or more of the parts at the junction to locally soften the binder without melting it, by using a melted filler feedstock as a glue at the junction between the parts, etc. The filler feedstock may have a different binder than that used in the green part such as to have a lower melting point to be liquid or paste-like at a temperature where the green parts remain solid.

The cooled green part, whether integrally molded or formed of two or more individual green parts, is then put through a debinding process to obtain a brown part. A brown part as discussed herein refers to a porous and friable part that is usually defined by an almost complete absence of binder. The brown part is likely held together by some pre-sintering where a degree of pre-sintered injection powder particles are held together by a weak interaction of the particles between spaces formed at points where the binder was originally found. However, in some cases the brown part may also include a residual amount of binder that helps to hold the brown part together before final sintering. The removal of the binder is typically done by either heating or dissolution with a solvent.

In the embodiment shown, the debinding process is performed by heating the green part. The green part is supported for the debinding process by a particulate shape retaining media, such as to minimize the deformations during the removal of the binder to obtain the brown part.

In prior processes, each opening of the green part is manually filled with the particulate media, for example by pushing the part into a bed of the particulate media and forcing the particulate media into each opening using an appropriately sized tool. However, as the complexity of the shape of the green part increases, for example through the interconnection of two or more green parts and/or an increase in the number of openings defined through the part and/or openings having more complex (e.g. curved) shapes, manual filling of each opening may become difficult and/or time consuming.

In a particular embodiment, it has been found that proper support of the surfaces of the green part may be facilitated using the following method.

Referring to FIG. 1, a green part 10 is shown. In the particular embodiment shown, the green part 10 is a fuel nozzle of a gas turbine engine, manufactured through a metal injection molding process; however, the method described herein is applicable to any other type of green part manufactured in a powder injection molding process.

As can be seen in FIG. 1, the green part 10 is placed on particulate shape retaining media 12, which is contained in an appropriate type of container 14 to form a bed. In a particular embodiment, the particulate media 12 is alumina ($Al_2O_3$).

Alternately, other particulate shape retaining media may also be used, including but not limited to CaO, MgO, zeolites, bentonite, clays, other metal oxides ($TiO_2$, $ZrO_2$), $SiO_2$, and combinations thereof. In a particular embodiment, the particulate shape retaining media includes dried and preferably calcined particulates. The particulate media is easily wetted by at least one of the major binder components in order to allow for the wicking of the binder to take place during the debinding process.

Referring to FIG. 2, the particulate media 12 is fluidized until the green part 10 penetrates therein. Fluidization as discussed herein refers to any process causing the particulate media 12 to pass from a fixed solid like condition to a dynamic solution or fluid like state; in other words, any process causing the particulate media 12 to behave and flow like a fluid, while remaining in the solid state. In a particular embodiment, this may be done through suspension of the particulates in a rapidly moving stream of gas, for example by providing the bottom of the container 14 with micro holes smaller than the individual particulates and in fluid communication with a pressurized gas container, with sufficient pressure to cause the particulate material to behave like a fluid through suspension within the flow of gas through the bottom of the container.

In the embodiment shown, fluidization of the particulate media 12 is obtained through vibrations. The container 14 of particulate media 12 is rigidly engaged to a support member 16 (e.g. vibrating table) which is vibrated at a predetermined frequency and with a predetermined amplitude causing fluidization of the particulate media 12.

The frequency and amplitude causing fluidization of the particulate media 12 is influenced by the properties of the particulates, including the grain size and distribution, morphology, surface texture, and the nature of the material used. It has been found that the predetermined frequency and amplitude is not significantly influenced by the configuration or number of green part(s) 10 being received therein. Accordingly, the predetermined frequency and amplitude may be determined through experimentation, for example by slowly increasing the frequency and lowering the amplitude from a typical compaction-type vibration, until a part deposited on top of the bed of particulate media 12 sinks in it, indicating that the particulate media 12 is fluidized. The maximum frequency/minimum amplitude threshold may be determined at the point where the particulate media 12 starts to be expelled from the container 14 under the force of the vibration.

For example, in a particular embodiment, fluidization of the alumina is obtained with a frequency of from about 30 to about 60 Hz, preferably but not limited to with an amplitude of from about 0.2 to about 0.5 mm.

Once the green part 10 has penetrated in the particulate media 12, and the particulate media 12 has filled all the openings 19 of the green part 10, the fluidization is stopped. Referring to FIG. 3, the particulate media 12 is then compacted around the green part 10 through vibrations at a different frequency than the fluidization. In a particular embodiment, the particulate media is vibrated in a manner creating repeated impacts with the support member 16.

In a particular embodiment, the compaction vibrations are performed at a lower frequency than the fluidization vibrations. In a particular embodiment, the compaction vibrations also have a higher amplitude than the fluidization vibrations.

In a particular embodiment, compaction and fluidization are performed in the same container 14, using the same equipment. In a particular embodiment, the green part 10 is completely covered by the particulate media after the fluidization; in another embodiment, after fluidization is stopped, additional particulate shape retaining media 12 is added to the bed to completely cover the green part 10. The support member 16 is then vibrated at the different frequency to compact the particulate media 12 around the green part 10 and in the openings 19 thereof.

In a particular embodiment, the container 14 is connected to the support member 16 through a connection 18 allowing relative movement, and thus impacts, therebetween during the compaction vibrations. For example, the container 14 is connected on one side 20 while the opposed side 22 remains free to pivot about the connected side 20. However, during the fluidization vibrations, the container 14 and support member 16 are rigidly connected such as to vibrate together. Accordingly, between the fluidization and the compaction, the container 14 is partially released from the support member 16 to allow the relative movement while still remaining connected thereto.

In another embodiment, the compaction and fluidization are performed using different equipment. Once the green part 10 has penetrated in the particulate media 12 and the fluidization is stopped, the green part 10 is carefully removed from the particulate media 12. The particulate media 12 within the openings 19 of the green part 10 is retained therein. The filled green part 10 is placed in another container 14', over a layer of particulate media 12, and particulate media 12 is placed on each side and over the green part 10 such as to bury it. The container 14' is attached to another support member 16' through a connection 18' allowing relative movement therebetween, and the second support member 16' is vibrated at the different frequency (e.g. lower frequency and/or higher amplitude) to compact the particulate media 12 around the green part 10.

Once the particulate media 12 is compacted, the green part 10 undergoes the debinding process, where heat is used to remove the binder and, if applicable, join the interconnected green parts. The binder melts and becomes liquid, and the particulate shape retaining media 12 wicks the molten liquid binder away from the green part within itself. In a particular embodiment, the ramp rate for the temperature is selected such as to avoid immediate vaporization of the binder to limit deformation of the part which could be caused by explosive escape of volatile vapours therefrom. The temperatures and ramp rates depend on the binder used. When the majority of the binder is removed as a liquid, the remaining binder may be heated at a faster rate for partial or full vaporization.

After debinding, the brown part is freed from the particulate media 12. Filled opening(s) are also freed from the particulate media 12; in hard to access area, compressed air can be used to free the opening(s). The part is then sintered to obtain the final product. In an alternate embodiment, the particulate media filling the openings may be selected such as to remain within the openings during sintering.

Although the method has been described herein with respect to the support of a green part for debinding, it may be used to support any other type of part requiring support by a particulate shape retaining media.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of supporting a part with particulate shape retaining media, the method comprising:
   placing the part on a bed of the particulate shape retaining media;
   fluidizing the particulate shape retaining media until the part penetrates therein, including vibrating the bed of particulate shape retaining media at a first frequency to cause the fluidization; and
   after the part has penetrated in the shape retaining media, changing the first frequency to a second frequency different from the first frequency and vibrating the bed of particulate shape retaining media at the second frequency to compact the particulate shape retaining media around the part.

2. The method as defined in claim 1, wherein the part is a green part to be debound in a powder injection molding process, and the particulate shape retaining media is wettable by at least one binder component of the green part.

3. The method as defined in claim 2, wherein the particulate shape retaining media is alumina.

4. The method as defined in claim 1, wherein the first frequency is from about 30 Hz to about 60 Hz.

5. The method as defined in claim 1, wherein the second frequency is lower than the first frequency.

6. The method as defined in claim 1, wherein vibrating the bed of particulate shape retaining media to compact the particulate shape retaining media includes impacting a container containing the bed of particulate shape retaining media.

7. The method as defined in claim 6, wherein vibrating the bed of particulate shape retaining media at the first frequency to fluidize the particulate shape retaining media is performed without impacting the container containing the bed of particulate shape retaining media.

8. The method as defined in claim 1, wherein the particulate shape retaining media is fluidized until the part is completely covered by the particulate shape retaining media.

9. The method as defined in claim 1, wherein the part includes at least one opening defined therein, and the bed of particulate shape retaining media is fluidized until the at least one opening is filled with the particulate shape retaining media.

10. A method of supporting a green part of a powder injection molding process with particulate shape retaining media for debinding, the method comprising:
    placing the part on a bed of the particulate shape retaining media, the particulate shape retaining media being wettable by at least one binder component of the green part;
    vibrating the bed at a first frequency causing fluidization of the particulate shape retaining media; and
    after the part is covered by the shape retaining media, changing the first frequency to a second frequency different from the first frequency and compacting the shape retaining media with vibrations at the second frequency.

11. The method as defined in claim 10, wherein the particulate shape retaining media is alumina.

12. The method as defined in claim 10, wherein the bed is vibrated at the second frequency by a support member while allowing relative movement and impact between the bed and the support member.

13. The method as defined in claim 12, wherein the bed is vibrated at the first frequency by vibrating the support member at the first frequency, the support member and the bed being rigidly interconnected during the vibration at the first frequency such as to avoid relative movement therebetween.

14. The method as defined in claim 10, wherein the first frequency is from about 30 Hz to about 60 Hz.

15. The method as defined in claim 10, wherein the second frequency is lower than the first frequency.

16. The method as defined in claim 10, wherein an amplitude of the vibration at the second frequency is larger than an amplitude of the vibration at the first frequency.

17. The method as defined in claim 10, wherein the particulate shape retaining media is fluidized until the part is completely covered by the particulate shape retaining media.

18. The method as defined in claim 10, wherein the part includes at least one opening defined therein, and the bed of particulate shape retaining media is vibrated at the first frequency until the at least one opening is filled with the particulate shape retaining media.

* * * * *